(12) United States Patent
Lewis

(10) Patent No.: US 8,097,152 B2
(45) Date of Patent: Jan. 17, 2012

(54) APPARATUS FOR REMOVAL OF OIL FROM ICE

(76) Inventor: James Clifford Lewis, Tomball, TX (US)

( * ) Notice: Subject to any disclaimer, the term of this patent is extended or adjusted under 35 U.S.C. 154(b) by 540 days.

(21) Appl. No.: 12/362,212

(22) Filed: Jan. 29, 2009

(65) Prior Publication Data

US 2010/0186647 A1   Jul. 29, 2010

(51) Int. Cl.
*B01D 35/00*   (2006.01)
(52) U.S. Cl. ........ 210/173; 210/175; 210/181; 210/187; 210/196; 210/242.1; 210/512.2; 210/923
(58) Field of Classification Search .................. 210/173, 210/175, 181, 187, 196, 242.1, 512.2, 923
See application file for complete search history.

(56) References Cited

U.S. PATENT DOCUMENTS

| | | | |
|---|---|---|---|
| 4,039,454 A * | 8/1977 | Miller et al. | 210/242.3 |
| 4,175,040 A | 11/1979 | Sammons et al. | |
| 4,409,957 A | 10/1983 | Muhammad | |
| 4,632,731 A * | 12/1986 | Bodle et al. | 201/4 |
| 5,021,165 A | 6/1991 | Kalnins | |
| 5,469,645 A * | 11/1995 | Aiken | 37/241 |

FOREIGN PATENT DOCUMENTS

WO   0053488   9/2000

* cited by examiner

*Primary Examiner* — Chester Barry
(74) *Attorney, Agent, or Firm* — Wong, Cabello, Lutsch, Rutherford & Brucculeri, L.L.P.

(57) ABSTRACT

An apparatus for removing oil from sea ice comprises modular crusher units which may be pivotally mounted on a barge or other vessel. A rotating, toothed drum crushes the ice against a grating and mixes it with warmed, recycled water to form an ice/water slurry which is conveyed by means of an auger to one or more melting units. The liquid phase output of the melting units is first conveyed to a surge tank and then to a separator unit which separates the oil from the water. The oil is conveyed to a storage tank for subsequent offloading and disposal and the water is returned in a recycle line to sprayers mounted in the crusher unit(s) for deicing the intake section of the crusher and mixing with the crushed sea ice to form an ice/water slurry for subsequent, on-board treatment. The modular design of the apparatus permits a plurality of units to be mounted on a vessel in a side-by-side array such that substantially the entire beam of the vessel at the stern (or bow) may be covered and used for ice intake.

13 Claims, 6 Drawing Sheets

APPARATUS FOR REMOVAL OF OIL FROM ICE

CROSS-REFERENCE TO RELATED APPLICATIONS

None

STATEMENT REGARDING FEDERALLY SPONSORED RESEARCH OR DEVELOPMENT

Not Applicable

BACKGROUND OF THE INVENTION

1. Field of the Invention

This invention relates to apparatus for environmental remediation. More particularly, it relates to devices for separating oil from oil-contaminated sea ice.

2. Description of the Related Art Including Information Disclosed Under 37 CFR 1.97 and 1.98

U.S. Pat. No. 5,469,645 describes a land vehicle system for collecting crude oil and other contaminants which have been spilled on snow and ice covered surfaces which includes a crawler tractor having an auger type collection and transfer mechanism for skimming the contaminant and a layer of snow and/or ice from the Earth's surface. The recovered oil and snow and/or ice are transported by a vacuum line to a storage and transport vehicle towed behind the tractor. The storage and transport vehicle may be self-propelled and includes an onboard storage tank which is heated to melt the snow and/or ice and a separator for separating air used to transport the contaminated snow and/or ice to the tank. The tractor includes onboard prime movers for operating a vacuum pump for collecting the contaminated snow and/or ice and a prime mover for propulsion and operation of the skimming and collection mechanism.

International Patent Publication No. WO 00/53488 describes a method and device for collecting oil mixed with ice blocks. In this method, ice is pressed under the surface of the water in which it is floating and forced along an inclined surface formed by a bar screen or a grating. The oil is separated from the ice by vibrating the inclined surface formed by the bar screen. The device may be attached to the side or bow of a ship.

U.S. Pat. No. 4,409,957 describes an apparatus for melting snow. The apparatus comprises a heating chamber which is vented to the atmosphere, with the heating chamber including an upper portion and a lower portion. Spaced heat exchangers are positioned in the lower portion, which are heated by hot gas flowing therethrough. The heat exchangers exhaust the hot gas into the heating chamber so that heat is applied to the snow via the heat exchangers and directly by the discharge of hot gas into the heating chamber. Drain means are also included for draining water from the apparatus.

U.S. Pat. No. 4,175,040 describes a centrifugal oil-water separator comprising an inner spinning bowl having openings near the lower outer periphery for passage of water therefrom into an outer bowl which remains stationary. The oil-water mixture is passed to the upper center of the spinning bowl with separation of the oil and water therein, concentrating the oil near the top of the inner bowl and disposable water is removed from the outer bowl.

BRIEF SUMMARY OF THE INVENTION

An ice cleaning system according to the present invention may be mounted on a barge or similar vessel. A barge with ice intake units on its aft end may be pushed stern first by a tugboat through a fairway having blocks of oil-contaminated ice floating therein to remove the oil from the ice.

Ice blocks enter crusher units where they are broken up and mixed with recycled water to form an ice/water slurry which is lifted by an Archimedes screw and propelled through conduits to melting units. The ice is melted in the melting units and the oil/water output from the melting units is conveyed via conduits to surge tank.

A pump in fluid communication with the surge tank transfers the oil/water mixture to a separator unit such as a hydrocyclone. Oil exiting the separator unit may be conveyed to a holding tank for subsequent offloading and disposal. Relatively warm water exits the separator and enters a recycle line and is returned to the crusher units to provide a deicing spray and to form a portion of the slurry conveyed to the melting unit(s). Excess recycle water (now substantially free of oil) is simply returned to the sea through the open ends of the crusher unit(s).

The crusher units may be modular in design such that they may be mounted adjacent to one another on the bow or stern of a vessel. In this way, the apparatus of the present invention may be fitted to various barges having differing beams.

The intake section of the crusher unit comprises a generally scoop-shaped structure formed by a pair of opposing, generally planar, side walls connected by a grating 4 and a contoured rear wall. The grating may comprise an array of generally vertical, spaced-apart plates having slots between adjacent plates into which ice to be broken by crusher teeth on a rotating drum.

A spray bar sprays relatively warm, recycled water from the separator unit onto the crusher drum and intake chute to deice the apparatus and help form a water/ice slurry that may be more easily conveyed to the melting unit(s) by an auger-type pump. A flex joint or flexible segment in the slurry conduit may be provided in order to allow the intake section of the crusher unit to be raised or lowered by hydraulic cylinders.

BRIEF DESCRIPTION OF THE SEVERAL VIEWS OF THE DRAWING(S)

DETAILED DESCRIPTION OF THE INVENTION

Figure 1:
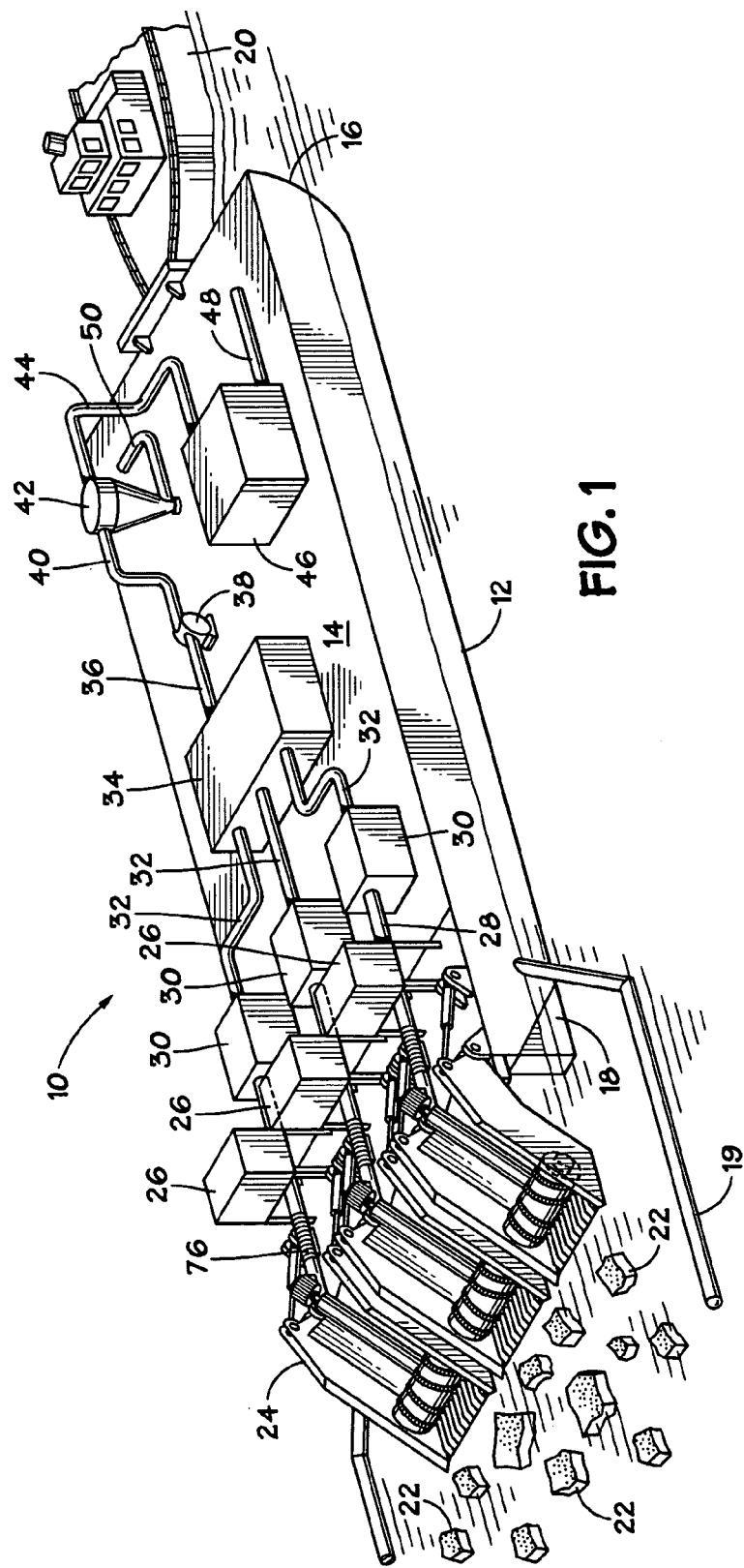
FIG. 1 is a perspective view of a barge equipped with an apparatus according to the invention being pushed into an ice field by a tug.

The invention may best be understood by reference to certain illustrative embodiments which are shown in the drawing figures.

Figure 2:
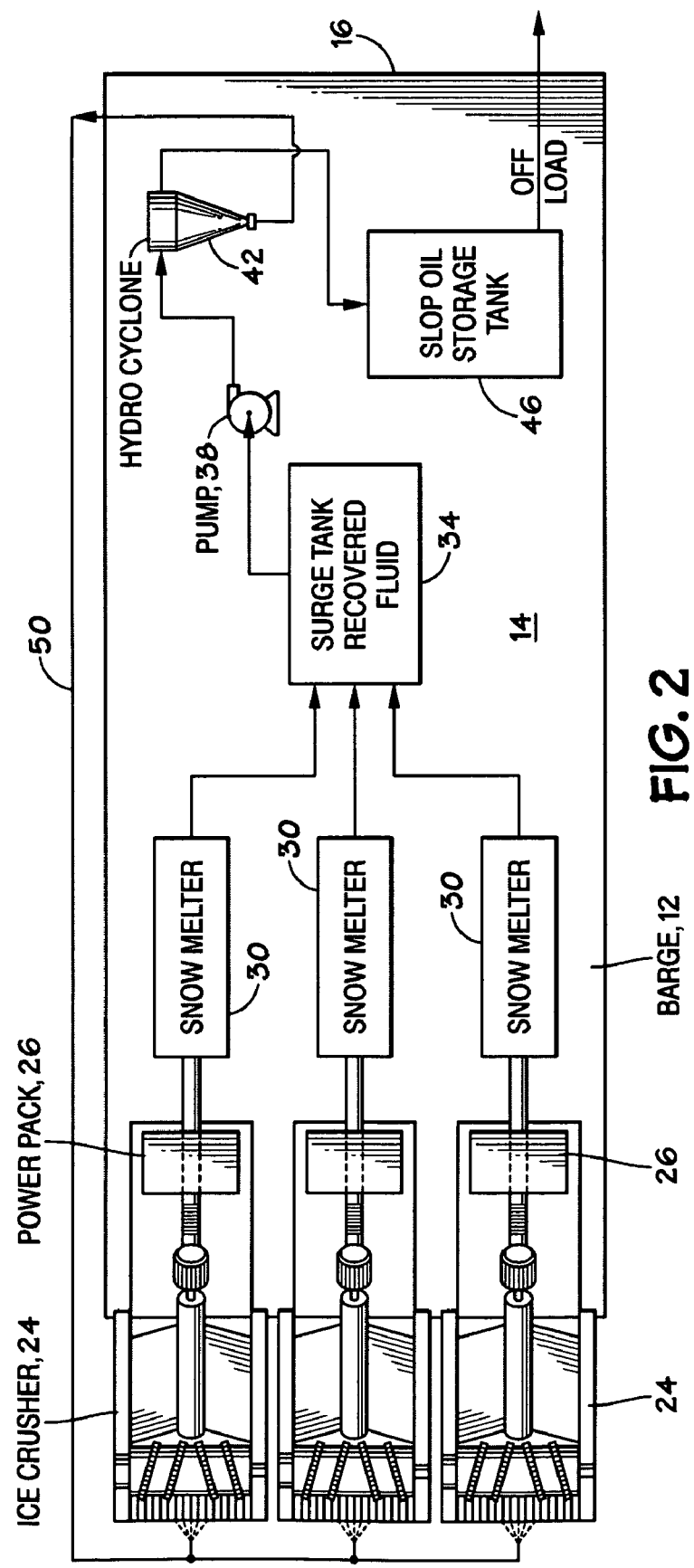
FIG. 2 is a schematic top plan view of a barge equipped with an apparatus according to the invention.

Referring to the perspective view of FIG. 1 and the schematic diagram of FIG. 2, an ice cleaning system 10 according to the present invention is shown mounted on a barge 12. Barge 12 comprises generally flat deck 14, bow section 16 and an opposing stern 17 which may include one or more skegs 18. Floating, segmented booms 19 may be attached to barge 12 near its stern to help guide floating blocks of ice 22 into the crusher units 24.

In the illustrated embodiment, barge 12 is being pushed stern first by tugboat 20 through a fairway having blocks 22 of oil-contaminated ice floating therein.

Ice blocks 22 enter the crusher units 24 where they are comminuted and mixed with recycled water to form a slurry which is lifted by augers 72 and propelled through conduits 28 to melting units 30. The ice is melted in the melting units and the oil/water output from the melting units is conveyed via conduits 32 to surge tank 34.

Pump 38 which is in fluid communication with tank 34 via conduit 36 transfers the oil/water mixture to separator 42 via conduit 40. Oil exiting separator 42 is conveyed to holding tank 46 via conduit 44. Water exits separator 42 via recycle line 50 and is returned to the crusher units 24 to provide a deicing spray and to form a portion of the slurry conveyed by the augers into conduits 28. Excess recycle water (now substantially free of oil) is simply returned to the sea through the open ends of crusher units 24.

Figure 3:
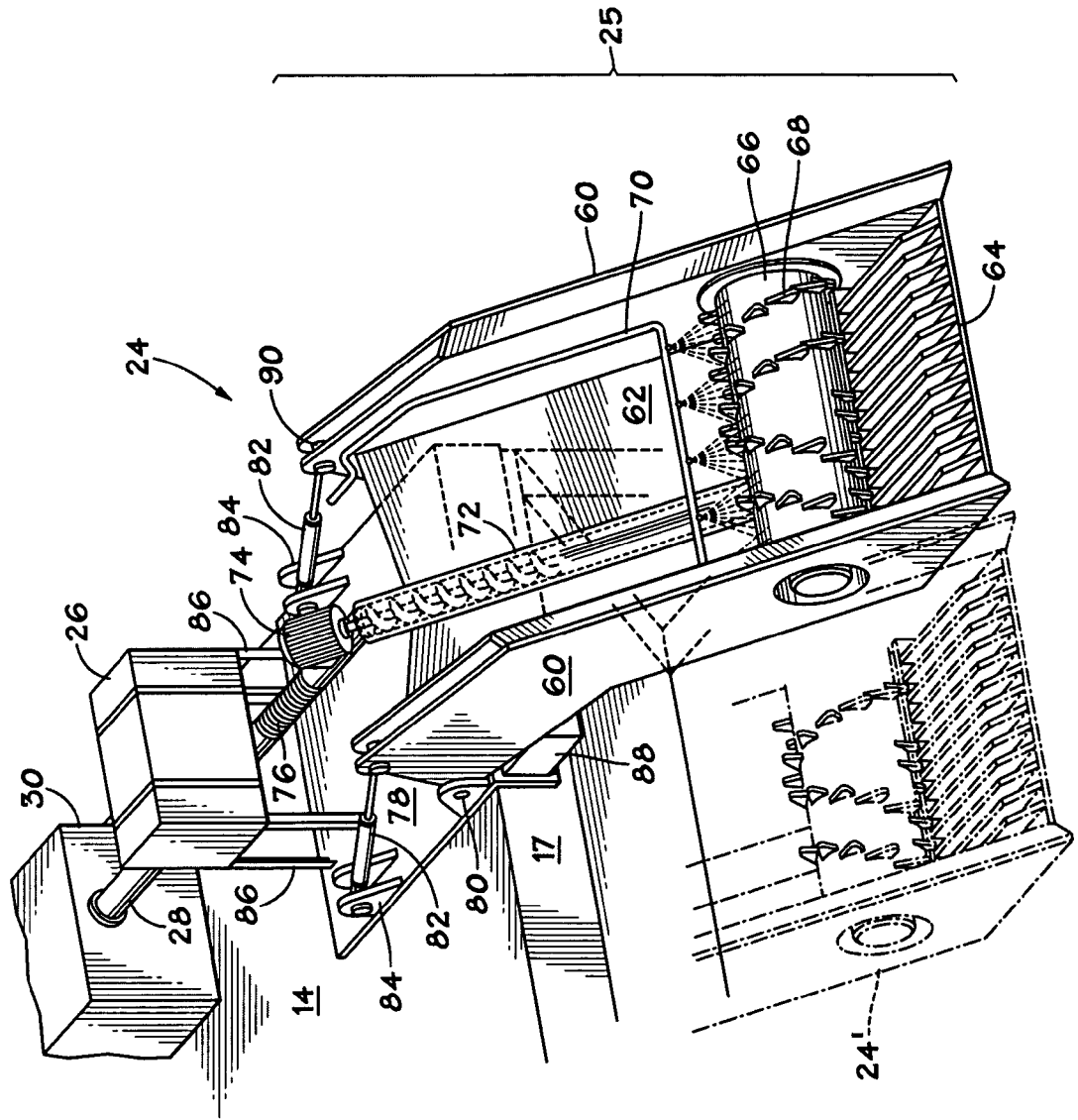
FIG. 3 is a perspective view, partially in phantom, of an ice intake unit according to the invention.
Figure 4:
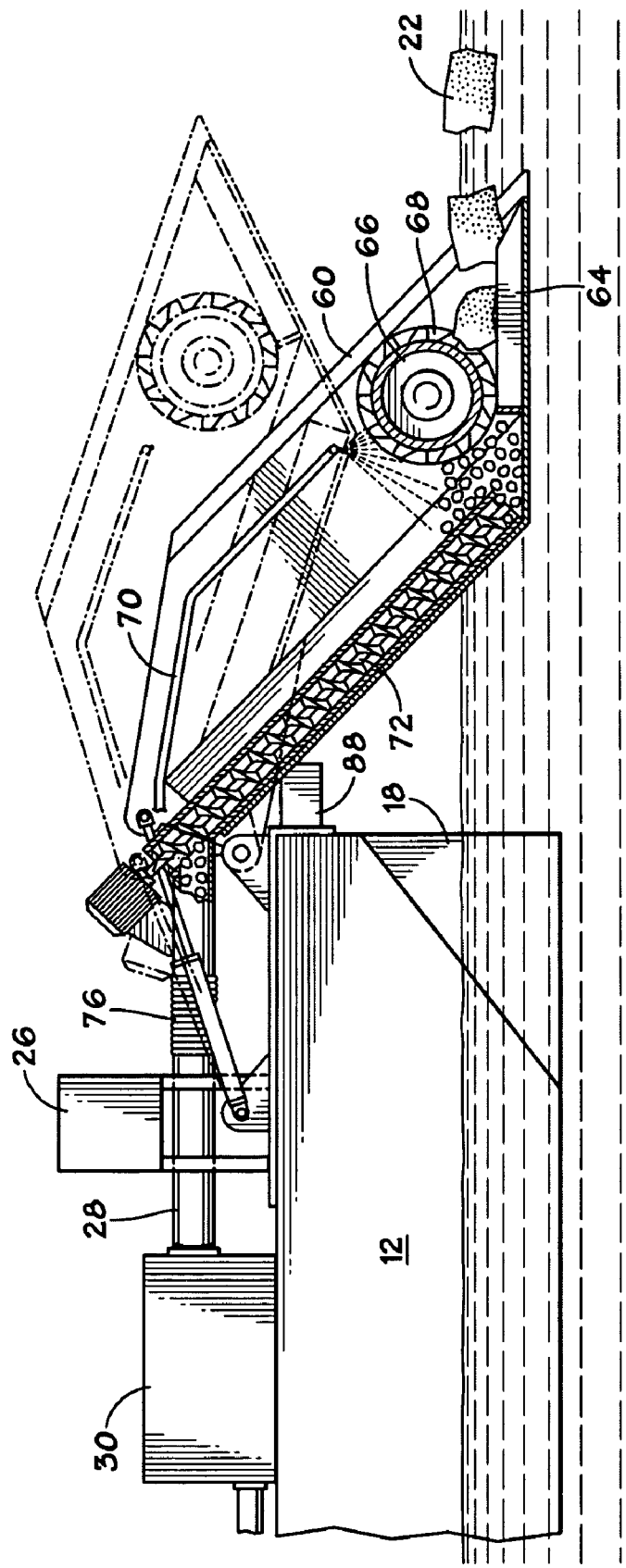
FIG. 4 is a partially cross-sectioned side view of an ice intake unit according to the invention mounted on the stern of a barge. The elevated position of the unit is shown in phantom.

A crusher unit 24 is illustrated in greater detail in FIGS. 3, 4, 5 and 6. In FIG. 3, crusher unit 24 is shown mounted on barge deck 14 and overhanging stern 17. Crusher 24 may comprise base plate 78 which provides a mounting platform for the equipment and allows the crusher to be unitized. As shown in phantom, one or more additional crusher units 24' may be mounted adjacent to crusher unit 24 on stern 17 of barge 12. In this way, the method of the present invention may be practiced on barges having differing beams.

Intake section 25 of crusher 24 comprises a generally scoop-shaped structure formed by a pair of opposing, generally planar, side walls 60 connected by grating 64 and back wall 62. Back wall 62 may have an upper surface shaped as shown in FIG. 3 to channel crushed ice and water into the intake of auger 72. Grating 64 comprises an array of generally vertical, spaced-apart plates having slots between adjacent plates into which ice is to be broken by crusher teeth 68 on rotating drum 66. The forward edge of each plate may be angled or beveled to provide an inclined surface for contacting the ice. This may facilitate movement of the ice onto the upper surface of grating 64. In certain preferred embodiments, crusher teeth 68 are spaced on drum 66 to coincide with the slots in grating 64 as drum 66 rotates.

Spray bar 70 sprays relatively warm water from recycle line 50 onto crusher drum 66 to deice the apparatus and help form a water/ice slurry that may be more easily conveyed by auger 72. Additional spray nozzles (not shown) may be provided to deice other portions of intake 25.

Auger 72 powered by motor 74 acts as an Archimedes screw to lift and transport the ice/water slurry produced by the crusher unit through conduit 28 to melter 30. Conduit 28 may include flex joint or flexible segment 76 to allow intake 25 to be raised or lowered by hydraulic cylinders 82.

In certain preferred embodiments, auger motor 74 is an hydraulic motor powered by hydraulic fluid supplied under pressure by power pack 26. As shown in FIG. 3, power pack 26 may be elevated on legs 86 so as to provide an unobstructed pathway for conduit 28. Other mounting configurations will be apparent to those skilled in the art.

In the illustrated embodiment, intake section 25 of crusher unit 24 is pivotally mounted to base plate 78 so as to permit the operator to adjust the depth of grating 64 in the water. As shown in phantom in FIG. 4, intake section 25 may be raised clear of the water when the barge is being towed to an operating area or for maintenance.

Intake 25 may be secured to mounting plate 78 by pivot 80 and hydraulic cylinders 82 which have a fixed end attached to fitting 84 on base plate 78 and a movable end attached to wall 60 at point 90. Extension and retraction of hydraulic cylinders 82 respectively lowers and raises intake section 25. Shelf-like extension 88 may be provided to limit the lower travel of intake section 25 and relieve the strain on hydraulic cylinders 82. During operation, intake section 25 is preferably positioned such that grating 64 is substantially coincident with the surface of the water. However, thicker ice formations may necessitate the lowering of intake unit 25 for optimum loading of ice into the unit.

Figure 6:
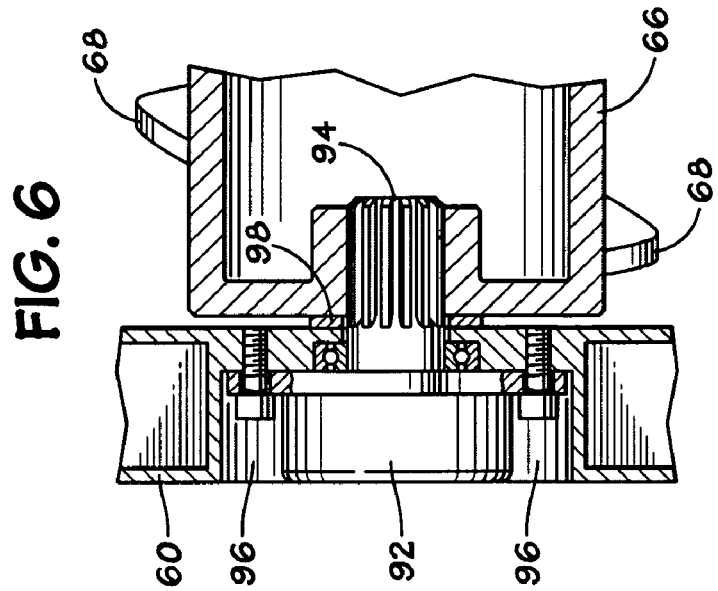
FIG. 6 is a cross-sectional view of a portion of an ice crusher together with its associated drive motor.
Figure 5A:
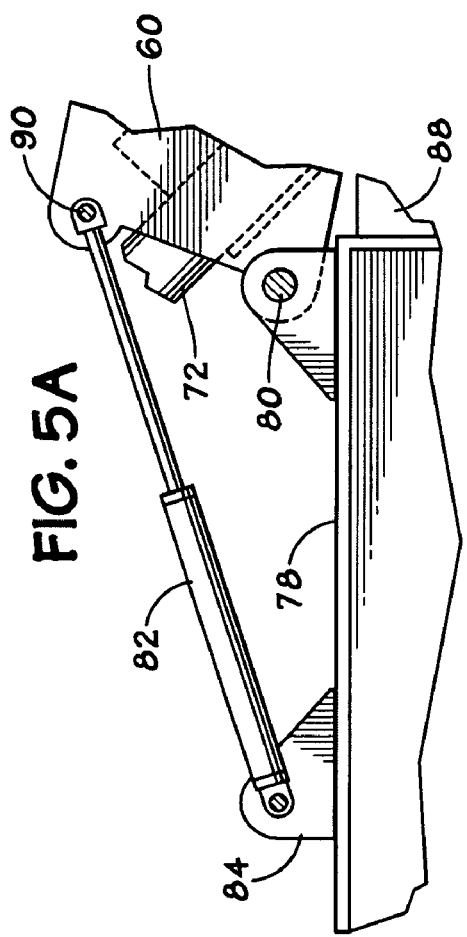
FIG. 5A is a side view of a pivot mechanism for an ice intake unit of the invention.
Figure 5B:
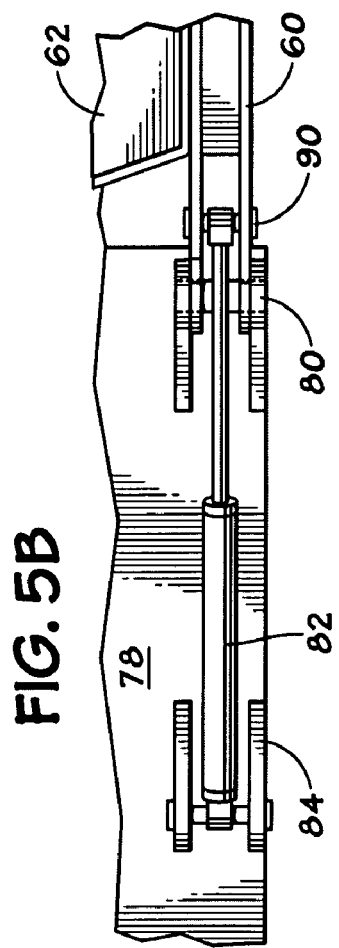
FIG. 5B is a top view of the pivot mechanism shown in FIG. 5A.

One particular preferred embodiment of a crusher drum drive mechanism is shown in FIG. 6. A recess 96 may be provided in side wall 60 of intake unit 25. Motor 92 may be connected to drum 66 by means of splined connector 94. Drum 66 may be displaced from the inner surface of wall 60 by means of spacer 98 such that it does not contact the inner side of wall 60 during its rotation.

In certain preferred embodiments, motor 92 is an hydraulic motor. In other embodiments, motor 92 is an electric motor. Motor 92 may fit entirely within recess 96 to facilitate the mounting of multiple crusher units in side-by-side arrangement on a vessel.

Figure 7:
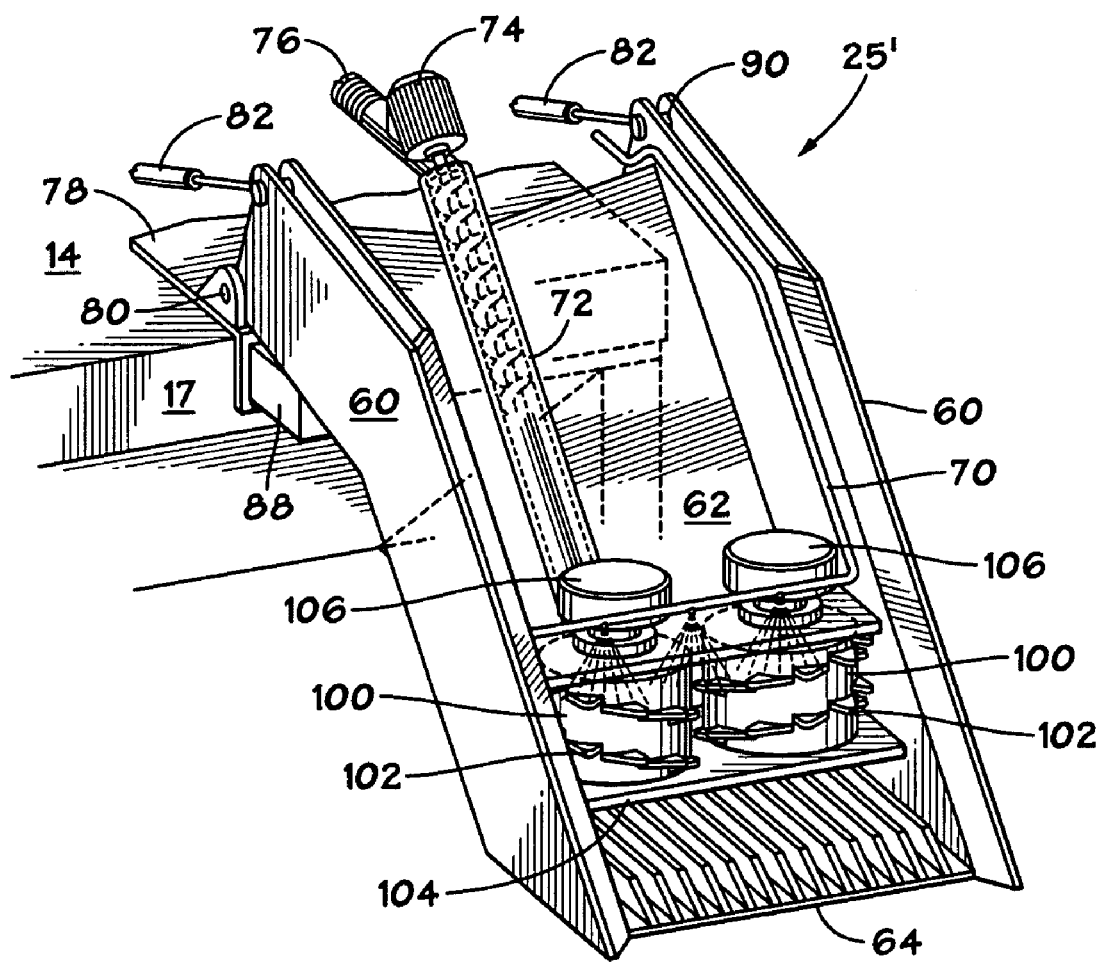
FIG. 7 is a perspective view of an ice intake unit according to a second embodiment of the invention.

A crusher unit according to an alternative embodiment of the invention is shown in FIG. 7. In this embodiment, intake section 25' comprises two, counter-rotating crusher drums 100 which turn about generally vertical axes. Intermeshing teeth 102 may be provided for engaging and drawing in pieces of ice to be crushed between the drums. Drums 102 may be mounted on generally horizontal platform 104 which may extend between side walls 60. As in the first embodiment, spray bar 70 may be provided to apply recycled water from the separator unit for the purpose of deicing intake unit 25' and providing water to form the slurry of ice and water which is lifted and transported via auger 72 into conduit 28.

Drums 100 may be rotated by means of motors 106. In certain embodiments, motors 106 may be hydraulic motors. In other embodiments, motors 106 may be electric motors.

Referring again to FIGS. 1 and 2, the ice/water slurry produced by each crusher unit 24 is conveyed via a conduit 28 to a dedicated melting unit 30. In yet other embodiments, the outflow of conduits 28 may be combined and sent to a single melting unit. In still other embodiments, the outflow of each conduit 28 may be split and sent to a plurality of melting units. In practice, the capacity of the melting unit(s) 30 will be selected to accommodate the output of the crusher units.

As noted above, a variety of snow or ice melting units are commercially available. It will be appreciated by those skilled in the art that the liquid phase oil/water output of the melters may be substantially above freezing and substantially above the open seawater temperature. Having a ready supply of warmed water for recycle permits the use of such water for deicing purposes in the intake sections 25 of crusher units 24.

The liquid phase output of the melting units 30 is conveyed via conduits 32 to surge tank 34. Depending on the residence time in tank 34, some separation of an upper oil phase and a lower water phase may occur. Surge tank 34 provides a capacity buffer for the system. As the tank becomes full, the intake process at the crusher units may be slowed in order to provide time for the separator unit 42 to draw down the level in tank 34.

Pump 38 may be provided to transfer the oil/water mixture from tank 34 to separator 42 (via conduit 40) at a controlled rate.

Separating oil and water in oil/water mixtures is required in many applications and the technology for effecting such separations is well-developed. Environmental and water-quality regulations often make it necessary to achieve a reduction of oil concentration to less than 50 ppm. There are presently several separation systems available for separating oil from water.

One simple separator system comprises a settling basin in which oil and water separate over time by gravity due to their density differences. The degree of separation is directly related to residence time in the basin.

Another method which is known as floatation uses the buoyancy of gas bubbles rising through the liquid to "float" contaminants, such as oil droplets, to the surface. The gas bubbles may be formed by the bubbling out of dissolved gas that occurs when pressure on the system is reduced or by injecting or dispersing gas into the water by a bubbling device.

In the illustrated embodiment, separator unit 42 comprises a hydrocyclone. Hydrocyclones are well-known separation devices which use a centrifugal effect to enhance the separation of liquids of different density such as water and oil. One design of a hydrocyclone comprises a long, funnel-shaped chamber into which a feed line is tangentially directed. An oil and water mixture under pressure is directed tangentially into the funnel-shaped separation chamber of a hydrocyclone via the feed line whereupon its energy is converted to angular momentum as the mixture swirls around the inside of the chamber. The swirling causes the less dense portion of the mixture (the oil) to move towards the axis of the device while the more dense portion (the water) is urged to the outside.

A typical hydrocyclone has a coaxial overflow outlet in its large end for providing an outlet for less dense phase from the hydrocyclone, and a coaxial underflow outlet, at the opposite end, for providing an outlet for the more dense phase from the hydrocyclone. The pressure difference between the overflow outlet and the underflow outlet, and the inlet flow rate determine the relative volumes of the overflow and underflow streams. Increasing the pressure at either outlet causes the flow through the opposite end to increase.

A predetermined degree of separation for a particular feed is achieved by providing a high enough velocity to create sufficient centrifugal force and by setting the relative volumes of the overflow and underflow. The pressure differential between inlet pressure and overflow pressure necessary to achieve sufficient overflow rate in a given hydrocyclone at a given inlet flow rate can be calculated. The pressure at the underflow outlet must be greater than the pressure at the overflow outlet to provide sufficient overflow rate.

It has been demonstrated that the oil droplets that remain in the water underflow of a hydrocyclone are coalesced to droplets having a large size by the action of the hydrocyclone. Because the larger droplets settle out of the water at a higher velocity than the smaller droplets, it is easier to separate in a skim vessel the oil remaining in the hydrocyclone underflow from the water than it is to separate the smaller oil droplets from the water in the inlet stream.

U.S. Pat. No. 5,021,165 discloses a system having separator vessels and a hydrocyclone for separating oil from water that includes a pressure reducing device immediately downstream of the hydrocyclone. The pressure reducing device allows the necessary pressure to be maintained at the underflow outlet while providing a reduction of pressure to vaporize part of the stream to "float" oil droplets in a flotation unit downstream of the hydrocyclone.

In any mixture of immiscible fluids, because the kinetic energy of the mixture contributes both to dispersion of larger droplets and coalescence of smaller droplets, at any given energy input rate there is a statistically defined maximum droplet size for which the rates of dispersion and coalescence are equal. Maximum droplet size is inversely related to the energy input rate of the system. It is also known that a rapid decrease in pressure results in shear forces on the mixture causing shearing of oil droplets larger than a certain diameter. Hence, to maintain the large droplets developed by coalescence in the hydrocyclone, it is desirable to minimize the pressure drop to which the mixture is subjected.

Although the invention has been described in detail with reference to certain preferred embodiments, variations and modifications exist within the scope and spirit of the invention as described and defined in the following claims.

What is claimed is:

1. An apparatus for separating oil from oil-contaminated ice comprising:
    an ice crusher having an input section adapted to gather ice floating in a body of water and an output section comprising means for mixing crushed ice with water from a recycled water line to produce an ice/water slurry;
    a pump adapted for pumping an ice/water slurry and having an intake connected to the ice crusher and a discharge connected to a melting unit;
    a melting unit for melting an ice/water slurry, said melting unit having an inlet connected to the pump discharge and an outlet connected to a separator; and,
    a separator for separating liquid phase water from liquid phase oil and having an inlet connected to the melting unit and a first, oil outlet connected to an oil holding tank and a second, water outlet connected to the recycled water line such that water output from the separator is returned to the ice crusher.

2. An apparatus as recited in claim 1 further comprising a surge tank connected to the outlet of the melting unit and the inlet of the separator.

3. An apparatus as recited in claim 2 further comprising a pump connected to the outlet of the surge tank and the inlet of the separator.

4. An apparatus as recited in claim 1 further comprising spray nozzles in fluid communication with the recycled water line said spray nozzles configured to direct a spray of recycled water on selected portions of the ice crusher.

5. An apparatus as recited in claim 4 wherein the recycled water is heated by heat applied in the melting unit.

6. An apparatus as recited in claim 1 further comprising a conduit connecting the pump and the melting unit and having at least one flexible section.

7. An apparatus as recited in claim 1 wherein the pump comprises an Archimedes screw.

8. An apparatus as recited in claim 1 wherein the ice crusher has an input section adapted to permit vertical adjustment.

9. An apparatus as recited in claim 1 further comprising a mounting plate adapted for modular installation of the crusher on the stern of a barge.

10. An apparatus as recited in claim 1 wherein the separator comprises a hydrocyclone.

11. An apparatus as recited in claim 1 wherein the melting unit comprises a snow melter.

12. A barge for removing oil from oil-contaminated ice floating in a body of water comprising:
    a bow section;
    an opposing stern section;

a deck extending substantially between the bow section and stern section;

an ice crusher mounted on the deck overhanging the stern and having an input section adapted to gather ice floating in a body of water when the barge is moved stern first through said body of water and an output section comprising means for mixing crushed ice with water from a recycled water line to produce an ice/water slurry;

a pump adapted for pumping an ice/water slurry and having an intake connected to the ice crusher and a discharge connected to a melting unit;

a melting unit for melting an ice/water slurry, said melting unit mounted on the deck and having an inlet connected to the pump discharge and an outlet connected to a separator; and, a separator mounted on the deck for separating liquid phase water from liquid phase oil and having an inlet connected to the melting unit and a first, oil outlet connected to an oil holding tank on the deck and a second, water outlet connected to the recycled water line such that water output from the separator is recycled to the ice crusher for production of the ice/water slurry.

13. A barge as recited in claim 12 comprising a plurality of ice crushers mounted in a side-by-side array across the stern section, the output of said plurality of ice crushers feeding a common separator.

\* \* \* \* \*